United States Patent

[11] 3,607,994

| [72] | Inventors | Janusz Jozef Henryk Krause;<br>Francis James Willson, both of Northwich, England |
|---|---|---|
| [21] | Appl. No. | 852,089 |
| [22] | Filed | Aug. 21, 1969 |
| [45] | Patented | Sept. 21, 1971 |
| [73] | Assignee | Imperial Chemical Industries Limited<br>London, England |
| [32] | Priority | Sept. 18, 1968 |
| [33] | | Great Britain |
| [31] | | 44402/68 |

[54] PROCESS FOR MAKING CAUSTIC SODA PELLETS
3 Claims, No Drawings

[52] U.S. Cl. .................................................. 264/14,
264/13, 18/2.7
[51] Int. Cl. .......................................................... B01j 2/04
[50] Field of Search ............................................ 264/13, 14,
15, 12; 18/1 B, 2.4, 2.5 M, 2.7

[56] References Cited
UNITED STATES PATENTS

| 1,601,898 | 10/1926 | Wiley et al. ................... | 264/12 |
| 1,773,257 | 8/1930 | Buse ............................. | 264/14 |

*Primary Examiner*—Robert F. White
*Assistant Examiner*—J. R. Hall
*Attorney*—Cushman, Darby & Cushman

ABSTRACT: Caustic soda in the novel form of anhydrous small spheres of approximately 0.50 to 2.0 millimeters diameter is made by projecting upwards in a chamber a stream of molten anhydrous caustic soda cocurrently with a stream of ambient cooling air surrounding the stream of caustic soda, and allowing the latter on reaching the highest point of its trajectory to turn over and fall on the outside of the stream of ascending air to the base of the chamber, the temperature of the spheres collected at the base being above 90° C. and preferably 120° to 200° C.

PROCESS FOR MAKING CAUSTIC SODA PELLETS

This invention relates to a novel method for converting a molten solid into small particles particularly to a method of converting molten caustic soda into small particles having novel physical properties.

Caustic soda is made commercially on a large scale in several forms of which flake and coarse powder are widely used in formulations, for example in alkaline cleaning compositions. For these uses it is desirable that caustic soda should contain as few fine particles as possible to avoid dust, be reasonably free-flowing and be readily conveyed ad mixed with other materials by mechanical methods. The flaked and powdered materials commercially available do not always possess these desirable properties, for example the flakes usually contain not insignificant proportions of powder, and the powders nearly always contain fines that are readily airborne and so are difficult to handle and hazardous to people working with them.

Known methods of making flaked and powdered caustic soda also involve difficulties and hazards associated with the mechanical operations of reducing the particle size of a solid that is hygroscopic, and attacks many materials of construction and the skin.

Most of the undesirable properties of flaked and powdered caustic soda and some of the problems of their manufacture could be eliminated if there were a simple method of converting molten caustic soda into small anhydrous particles of substantially uniform size and free from fines without any grinding or flaking operations.

It is the object of the present invention to provide such a method and also to provide caustic soda in a novel physical form, and it has been achieved by means of a novel method of spray-cooling molten caustic soda.

According to our invention we provide a process for making caustic soda in the form of small spherical particles comprising forcing molten caustic soda through a nozzle located in or adjacent to the base of a chamber in an ascending stream within the chamber, surrounding said stream throughout its upward trajectory by a cocurrently flowing stream of cooling air that enters the chamber through orifices disposed around said nozzle, extracting said air from the chamber at a point above the highest point reached by the stream of caustic soda in its trajectory, allowing the stream of caustic soda after reaching said highest point to fall back by gravity towards the base of the chamber in such a manner that it is now outside of and surrounds the ascending stream of cooling air, maintaining the temperature of the particles of caustic soda that are formed above 90° C., collecting particles of caustic soda in the base of the chamber and removing them therefrom.

We have found surprisingly that ordinary ambient air containing water vapor, even saturated air, can conveniently be used as the cooling air. Caustic soda is hygroscopic under normal atmospheric conditions and one would expect it to be necessary to use dry cooling air. For example air having a dewpoint of 15° C. contains enough moisture to give a caustic soda containing about 5% of water by weight if it be used to cool molten caustic soda to near ambient temperature. Provided the temperature of the particles of solid caustic soda inside the chamber does not fall below a certain minimum the amount of water they pick up is negligible and they remain anhydrous. The minimum temperature is conveniently set at 90° C. but it is preferable to operate the process in such a way that the temperature of the particles at the collecting point inside the chamber is from 120° C. to 200° C., though it can be higher. The temperature of the air leaving the top of the chamber is a useful indication of the temperature inside, and we have found that if it is about 120° C. to 160° C. the temperature of the caustic soda particles does not fall below 90° C. and they remain anhydrous even if the ambient air be saturated with water vapor. The use of ambient air avoids the need to dry the cooling air or to cool and clean recirculating air.

The stream of cooling air performs two essential functions. One is to cool the molten caustic soda to the point where if solidifies into particles; the other is to prevent the particles falling back on to the nozzle and air orifices. Any solid particles formed in the upward part of the trajectory of the caustic soda are carried on and up by the air and prevented by it from falling back. At the highest point of the trajectory solid particles and any still liquid caustic soda reverse their direction of flow and fall on the outside of the ascending stream of air which likewise keeps them away from the nozzle and air orifices. The air stream thus behaves as if it were a hollow tube acting as a guide for material inside it and as a barrier against material outside.

Compared with known methods of converting molten solids into small particles, for example the prilling of ammonium nitrate, where the melt is projected inside chambers downwards, or horizontally and downwards, the method of the invention has the advantage of providing a greater trajectory for a given height of chamber. In practice this means that the chamber need be no more than half the height of what the known art would require.

The air stream on leaving the chamber by the top may be passed if desired through a cyclone to remove any fine airborne particles of caustic soda. It is found however that the proportion of such fine particles is surprisingly low since practically all the molten caustic soda issuing from the nozzle is recovered as substantially spherical particles of approximately 0.50 to 2.0 mms. diameter at the base of the chamber.

EXAMPLE A

Molten caustic soda at a temperature of 320°–340° C. was fed under pressure of ca. 30 lb./sq.in. to a nozzle, arranged to project a spray of the caustic soda vertically upwards to a height of approximately 20 feet, and situated centrally at the base of a cylindrical spraying chamber 30 feet high and 14 feet diameter. The nozzle was surrounded by an annulus through which ambient air, used to cool the caustic soda, was drawn into the chamber in cocurrent flow with the caustic spray. Hot air was drawn from the top of the chamber and passed through a wet scrubber to remove any caustic dust before being discharged by a fan to atmosphere. The base of the chamber was arranged in the form of a cone to collect the solidified particles of caustic soda which formed in the air stream. This equipment produced 15 tons per 24 hours of substantially spherical anhydrous caustic soda particles of diameter approximately 0.50 to 1.50 millimeters. The temperature of the caustic soda particles at the gathering point was 160°–200° C. and the temperature of the air stream leaving the chamber was 120°–140° C.

What we claim is:

1. A process for making caustic soda in the form of small spherical particles comprising forcing molten caustic soda through a nozzle located in or adjacent to the base of chamber in a vertically ascending stream within the chamber, surrounding said stream throughout its upward trajectory by a cocurrently flowing stream of cooling air that enters the chamber through orifices disposed around said nozzle and prevents particles from falling back onto said nozzle and said cooling air orifices, extracting said air from the chamber at a point above the highest point reached by the stream of caustic soda in its trajectory, allowing particles formed from the stream of caustic soda after reaching said highest point to fall back by gravity towards the base of the chamber in such a manner that they are now outside of and surround the ascending stream of cooling air, maintaining the temperature of the particles of caustic soda that are formed between 90° C. and the solidification temperature of caustic soda, collecting particles of caustic soda in the base of the chamber and removing them therefrom.

2. A process as claimed in claim 1 in which the temperature of the particles of caustic soda that are formed is from 120° to 200° C.

3. A process as claimed in claim 1 in which the cooling air is ambient air containing water vapor.